United States Patent [19]
Little

[11] 3,723,038
[45] Mar. 27, 1973

[54] INJECTION MOLDING APPARATUS
[76] Inventor: Harry H. Little, 202 Cedar lane, Vienna, Va. 22180
[22] Filed: Sept. 16, 1970
[21] Appl. No.: 72,588

[52] U.S. Cl. .................. 425/192, 425/247, 425/450
[51] Int. Cl. ............................................. B29f 1/00
[58] Field of Search .......... 18/5.7, 34.1, 12 P, 30 QB; 425/247, 176, 450, 192, 190

[56] References Cited
UNITED STATES PATENTS

| 3,246,368 | 4/1966 | Gross et al. | 18/5.7 X |
| 1,353,942 | 9/1920 | Akin | 425/247 X |
| 2,948,018 | 8/1960 | Hintermann et al. | 425/247 |

Primary Examiner—Robert L. Spicer, Jr.
Attorney—Ronald L. Phillips

[57] ABSTRACT

There is disclosed an injection molding apparatus having a cartridge for containing a molding material which is injected by operation of a fluid pressure operated motor through a nozzle into a multipart mold whose parts are clamped together by the camming action of a clamp. The mold has an injection port receiving the cartridge's nozzle to provide for injection of the molding material into the mold. The nozzle and port also cooperate to support the mold relative to the cartridge. A second clamp is provided to clamp the mold to the cartridge during the injection operation.

1 Claim, 3 Drawing Figures

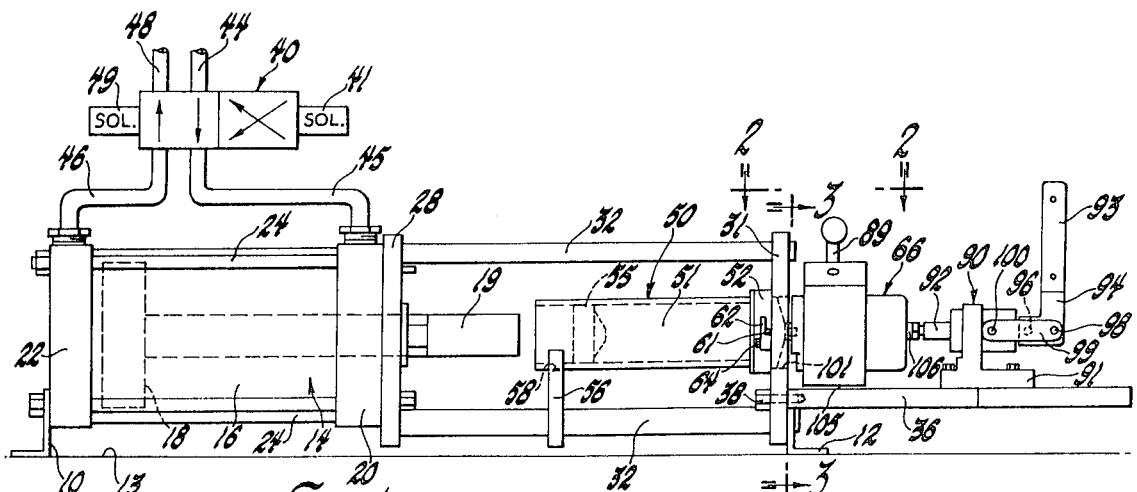
Fig. 2
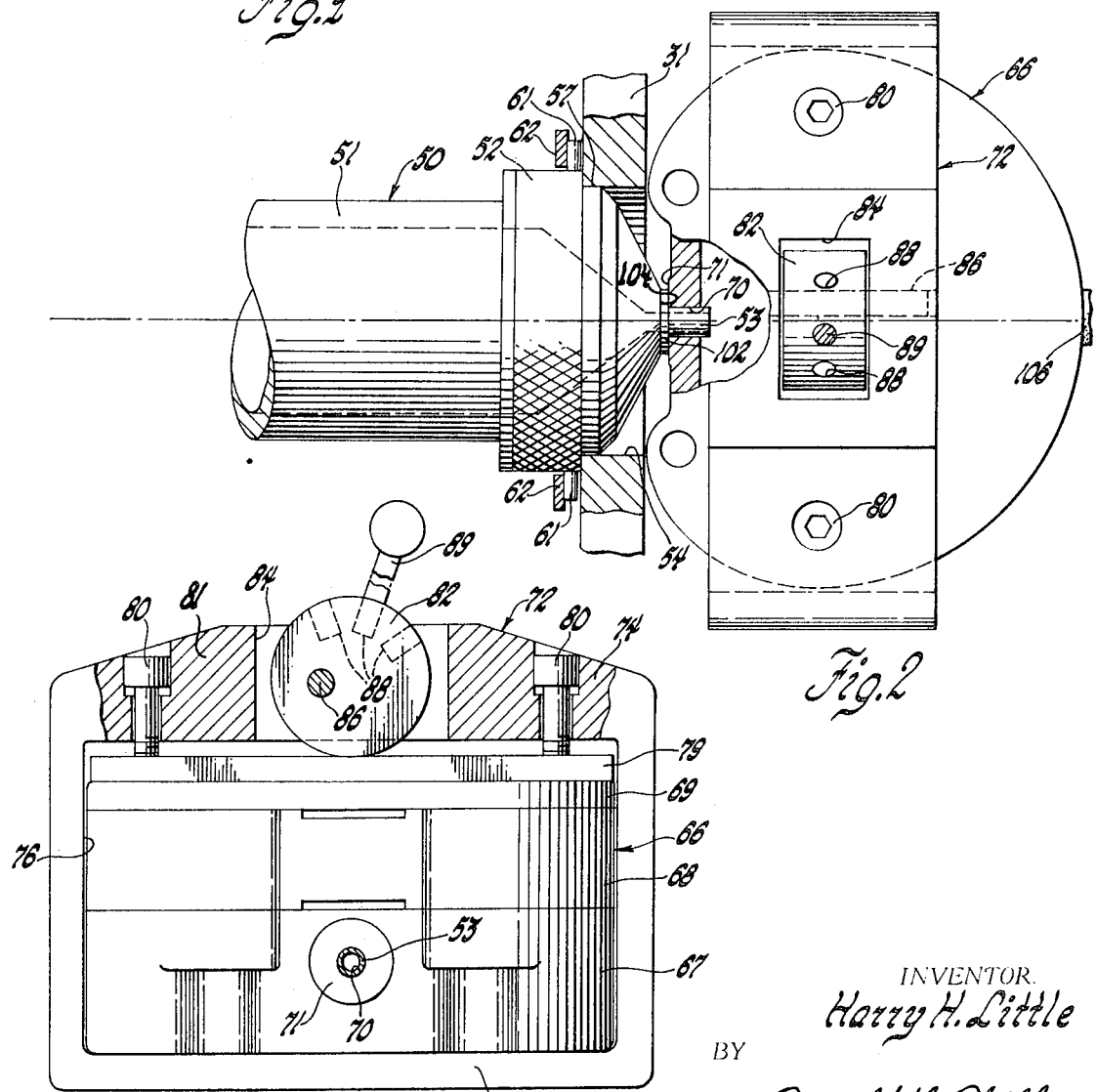
Fig. 2
Fig. 3
INVENTOR.
Harry H. Little
BY
Ronald L. Phillips
ATTORNEY

INJECTION MOLDING APPARATUS

This invention relates to injection molding apparatus and more particularly to injection molding apparatus having the mold releasably clamped to the injector.

The injection molding apparatus according to the present invention is particularly suited for injection molding dentures where the mold which is commonly called a flask comprises several parts. In one still common method of molding dentures, a cold plastic material is placed in the flask's cavity and then the flask parts are clamped together and the flask, while clamped with the plastic material sealed therein, is then subjected to an elevated temperature to cure the plastic. It is still common practice to thus pack the plastic material into the flask since the injection molding apparatus that has thus far been made available for molding articles of this nature has generally proved unwieldy or required considerable amount of time of the operator in first providing proper association between the flask and the injector and then maintaining the flask clamped for the curing operation.

An object of the present invention is to provide a new and improved injection molding apparatus.

Another object is to provide an injection molding apparatus having a multipart mold which is releasably clamped together by camming action and is also clamped to the injector.

Another object is to provide injection molding apparatus having a multipart mold which is clamped together by camming action and which is in turn clamped to an injector so that the clamped mold, after the injection operation, may be detached from the molding apparatus in a clamped condition for subsequent curing of the molded articles.

These and other objects of the present invention will be more apparent from the following description and drawing in which:

FIG. 1 is a view in elevation of an injection molding apparatus according to the present invention wherein the control for the apparatus is diagrammatically shown.

FIG. 2 is an enlarged partial view taken on the line 2—2 in FIG. 1 with certain parts broken away.

FIG. 3 is an enlarged view taken on the line 3—3 in FIG. 1.

The injection molding apparatus illustrated in the drawing is particularly suited for injection molding of dentures, and, as shown in FIG. 1, comprises a frame having spaced foot members 10 and 12 which serve to support the apparatus on a flat surface 13. A fluid pressure operated motor 14 which provides the force for the injection molding operation as described in more detail later is an integral part of the frame and comprises a cylinder 16 in which is slideably mounted a piston 18. Piston 18 is connected to a cylindrical piston rod 19 which extends through an aperture in a square shaped cylinder head 20 which closes the right-hand end of cylinder 16, there being provided a suitable sealing arrangement between the head and piston rod. The other end of cylinder 16 is closed by a square shaped cylinder head 22. The cylinder heads 20 and 22 and intermediate cylinder 16 are clamped together by four bolts 24 located at the corners of the heads. The two lower bolts 24 connect the foot member 10 to the frame structure and also cooperate with the remaining two upper bolts 24 to connect a square shaped vertical plate 28 to the right-hand side of head 20. Another square shaped vertical plate 31 is spaced from and secured to plate 28 by four bolts 32 located at the corners of this plate with the two lower bolts also serving to connect the foot member 12 to the frame. A horizontal plate 36 is secured at right angles to the right-hand side of the plate 31 by bolts 38 to complete the frame.

The motor's control which is diagrammatically shown in FIG. 1, comprises a valve 40 which is operated by a solenoid 41 to move to a piston retract position as shown in which a line 44 supplied with fluid pressure from any suitable source is connected by a line 45 to supply the fluid pressure to the right-hand end of cylinder 16 to move the piston 18 leftward to the position shown while a line 46 connected to the left-hand end of the cylinder is connected to an exhaust line 48 to permit such retracting movement of the piston. Alternatively and selectively, the valve 40 is operated by actuation of a solenoid 49 to move to a piston advance position in which the line 45 is then connected to exhaust line 48 and line 46 is connected to the fluid pressure supply line 44 in which event the left-hand end of the cylinder is pressurized while the right-hand end of the cylinder is exhausted resulting in rightward movement of the piston which shall be called an advancing movement.

A cartridge 50 for containing the molding material to be injected, comprises as shown in FIGS. 1 and 2 a cylinder 51 which is closed at its right-hand end by a nozzle head 52 that is threadably secured thereon and has a nozzle 53 which extends through an aperture 54 in plate 31. A piston 55 is slidably mounted in cylinder 51 to entrap the molding material and to provide for forcing it out through the nozzle 53. The molding material is ejected out from the cartridge when the motor is operated to advance the piston rod 19 rightward to engage and move the piston 55 rightward, the piston rod and cartridge cylinder being axially aligned. The cartridge 50 is detachably mounted on the frame by means of a vertical support member 56 which is mounted on the two lower bolts 32 intermediate the plates 31 and 28 and has a semicircular cut-out 58 for receiving the cylinder 51 near its left-hand end. The right-hand end of the cartridge 50 is supported in plate 31 by a land 57 on nozzle head 52 closely fitting in aperture 54. The right-hand end of the cartridge 50 is secured to plate 31 by a bayonet connection comprising a pair of axially aligned pins 61 which are secured to and extend radially out from the nozzle head 52 and engage lugs 62 that are secured by bolts 64 to the left-hand side of plate 31.

The mold for molding the article desired which in this case is a denture, is commonly called a flask and is generally designated as 66. The flask 66 as shown in FIGS. 2 and 3 comprises a cup shaped base member 67, an intermediate member 68 and a lid or cover plate 69. As well known in the dental art, the denture forming cast member is suitably secured within the cup shaped member 67 and the intermediate member 68 contains the investment or countermold. Provision is made for injecting molding material such as a cold plastic of suitable type into the mold by a circular injection port 70 which extends through the wall of base member 67 and is connected by a suitable spew, not shown, to the mold cavity, there being provided a flat surface 71 on the flask perpendicular to and surrounding the injection port 70, for reasons which will become more apparent later.

With a mold cavity conforming to the denture desired positioned in the flask 66, the parts of the flask are clamped together as best shown in FIG. 3. This clamping is provided by a clamp generally designated as 72 which comprises a generally rectangular shaped frame 74 whose interior 76 is sized to accommodate the multipart flask 66. With the flask inserted in the clamp 72, the bottom of the flask rests on the base portion 78 of the clamp and the top of the flask lid 69 is engaged by a rectangular shaped clamping plate 79 which is guided for vertical movement and retained in the clamp by a pair of bolts 80, these bolts being piloted in vertical bores in upper portion 81 of frame 74 and threaded at their lower ends to the plate 79 at spaced points. The plate 79 is urgeable downward to clamp the parts of the flask together by a camming action provided by a circular shaped cam 82 which is located in a vertically extending aperture 84 through the center of the upper frame portion 81. The cam 82 is pivotally mounted on the clamp frame by an eccentrically located pivot pin 86. A series of circumferentially arranged radially extending sockets 88 are provided in the cam 82 and a lever 89 which is insertable in any one of these sockets is for effecting pivoting of the cam 82. As the cam 82 is pivoted clockwise as viewed in FIG. 3, it engages and forces the locking plate 79 downward to effect the clamping action. With the flask thus clamped, the lever 89 may then be removed.

Referring to FIG. 1, another clamp generally designated as 90 is for clamping the flask to the injector provided by cartridge 50 and comprises a base 91 which is bolted to the plate 36 at a remote distance from the plate 31. A rod 92 is reciprocally mounted in base 91 and is axially aligned with the nozzle 53 for reasons which will become more apparent later. A handle 93 has a right angle sector 94 which is pivoted by a pin 96 to the right-hand end of the rod 92 and is also pivoted by a pin 98 at the intersection of the right angle to links 99 that are pivoted at their opposite ends by a pin 100 to the base 91. Thus, it can be seen that the clamp 90 is of the toggle type and on counterclockwise movement of the lever 93 as viewed in FIG. 1, the rod 92 will move rightward and clockwise pivotal movement will move rod 92 leftward.

With the parts of flask 66 clamped together by the clamp 72 and with the cartridge 50 containing the molding material in place on the frame, the operator locates the clamped flask so that the nozzle 53 extends into the injection port 70. To seal this connection there is provided a rubber ring seal 102 which on one side engages the flat surface 71 formed on the flask and on the other side engages a flat shoulder 104 formed on the nozzle head. Then the clamp 90 is operated to advance the rod 92 leftward so that its left-hand end which is provided with a rubber tip 106 engages the clamped flask 66 forcing it leftward whereby the flask is clamped to the cartridge 50 with the seal 102 forced by this clamping action to seal the connection of the nozzle and the injection port. As the flask is clamped to the cartridge, the alignment of the nozzle 53, injection port 70 and the line of action of the clamp 90 insures a proper mating of the flask and cartridge and proper sealing contact, such operation being accomplished independent of any direct support of the frame means as shown by the clearance 105 in FIG. 1. With the clamped flask 66 thus clamped to the cartridge 50, the motor 14 is operated to advance the piston rod 19 rightward to force the piston 55 to effect injection of the molding material into the flask. When the flask is thus charged with molding material, the clamp 90 is released and a suitable plug is inserted into the injection port 70 to maintain the molding material therein. The flask 66 whose parts remain clamped by the clamp 72 is then removed from the frame and subjected to an elevated temperature to cure the plastic material injected therein.

The above described embodiment is illustrative of the invention which may be modified within the scope of the appended claims.

I claim:

1. In an apparatus for injection molding articles the combination of a fluid pressure operated motor having a piston with a piston rod that extends from one end thereof and is translated by fluid pressure, a cartridge support member having opposite faces spaced from said one end of said motor, a plurality of elongated securing means spaced about said piston rod and extending from said one end of said motor to said cartridge support member for rigidly securing said motor and said cartridge support member together in spaced relationship, cartridge means including a nozzle head with a nozzle and a plunger for forcing molding material out through said nozzle, said cartridge means insertable between said one end of said motor and one face of said cartridge support member, said cartridge support member having an aperture extending therethrough in axial alignment with said piston rod for receiving said nozzle head, said nozzle head and said cartridge support member on said one face having abutment means comprising a shoulder on said nozzle head and a wall portion of said cartridge support member adjacent said aperture that operate to prevent movement of said cartridge means away from said motor on movement of said plunger of said cartridge means by said piston rod toward said cartridge support member, said nozzle head and said cartridge support member on said one face having releasable securing means comprising lug and pin means for cooperating to prevent movement of said cartridge means away from said cartridge support member toward said motor, a multipart mold having a cavity conforming to the articles to be molded, first clamp means including cam means for releasably clamping together the parts of said mold, said mold further having an injection port in one side for receiving said nozzle to provide for injection of molding material from said cartridge means into the cavity of said mold, a clamp attaching plate rigidly secured to and extending away from the other face of said cartridge support member, said clamp attaching plate spaced along its length from a center line through said aperture in the cartridge support member so that said mold with said first clamp means may be positioned on said nozzle and have clearance with respect to said clamp attaching plate, and second clamp means secured to said including a translatable clamping member that remains aligned with the center line through said aperture in said cartridge support member during translation and is engagable with said mold on a side opposite said one side in a position aligned with said nozzle for cooperating with said releasable securing means to releasably clamp said mold with said first clamp means to said nozzle head with clearance with respect to said clamp attaching plate whereby said nozzle, said injection port and said second clamp means locate and hold said mold with said first clamp means to said cartridge means independent of any other support of said mold and said first clamp means.

* * * * *